United States Patent
Lehtomäki et al.

(10) Patent No.: US 10,437,438 B2
(45) Date of Patent: Oct. 8, 2019

(54) LAYOUT GUIDANCE FOR LOCALIZATION

(71) Applicant: CRF Box Oy, Helsinki (FI)

(72) Inventors: Riku Lehtomäki, Helsinki (FI); Jussi Nykänen, Helsinki (FI)

(73) Assignee: CRF BOX OY, Helsinki (FI)

( * ) Notice: Subject to any disclaimer, the term of this patent is extended or adjusted under 35 U.S.C. 154(b) by 0 days.

(21) Appl. No.: 16/108,943

(22) Filed: Aug. 22, 2018

(65) Prior Publication Data
US 2019/0065019 A1    Feb. 28, 2019

(30) Foreign Application Priority Data

Aug. 29, 2017 (FI) ...................................... 20175770

(51) Int. Cl.
*G06F 3/0484* (2013.01)
*G06F 17/28* (2006.01)
*G06F 17/21* (2006.01)
*G06F 9/451* (2018.01)

(52) U.S. Cl.
CPC ............ *G06F 3/0484* (2013.01); *G06F 9/454* (2018.02); *G06F 17/214* (2013.01); *G06F 17/289* (2013.01); *G06F 17/2854* (2013.01)

(58) Field of Classification Search
None
See application file for complete search history.

(56) References Cited

U.S. PATENT DOCUMENTS

| 9,639,528 | B1 * | 5/2017 | Hoffmann | G06F 9/454 |
| 2006/0248071 | A1 * | 11/2006 | Campbell | G06F 17/211 |
| 2011/0144972 | A1 | 6/2011 | Koenig | |
| 2013/0055117 | A1 * | 2/2013 | Sahibzada | G06F 8/38 715/762 |
| 2015/0324336 | A1 | 11/2015 | Glezos et al. | |
| 2016/0246763 | A1 * | 8/2016 | Higuchi | G06F 17/21 |

FOREIGN PATENT DOCUMENTS

EP    1857928 A1    11/2007

OTHER PUBLICATIONS

Office Action issued by the Finnish Patent and Registration Office in relation to Finnish Application No. 20175770 dated Dec. 21, 2017 (7 pages).

(Continued)

*Primary Examiner* — Christopher J Fibbi
(74) *Attorney, Agent, or Firm* — Robert P. Michal, Esq.; Carter, DeLuca & Farrell LLP (57) ABSTRACT

An electronic device for layout guidance for localization purposes includes a processor which receives information on a textual element in a source language. The textual element is within a graphical presentation having upper limits in at least a first dimension and a second dimension. The processor determines a space requirement in the first dimension and/or the second dimension for the textual element in a target language, based on the received information on the textual element in the source language and on statistical data related to the source language and the target language and their respective spatial requirements. The processor causes layout guidance to be displayed on a display for the textual element in the target language based on the determined space requirement.

23 Claims, 7 Drawing Sheets

(56) References Cited

OTHER PUBLICATIONS

Office Action issued by the Finnish Patent and Registration Office in relation to Finnish Application No. 20175770 dated May 11, 2018 (5 pages).
Notification Under Section 19 of Patents Act—Application Accepted issued by the Finnish Patent and Registration Office in relation to Finnish Application No. 20175770 dated Dec. 19, 2018 (5 pages).
Communication of Acceptance issued by the Finnish Patent and Registration Office in relation to Finnish Application No. 20175770 dated Sep. 4, 2018 (3 pages).
Notification Under Section 19 of Patents Ac—Application Accepted issued by the Finnish Patent and Registration Office in relation to Finnish Application No. 20175770 dated Dec. 19, 2018 (1 pages).
Finnish Search Report issued by the Finnish Patent and Registration Office in relation to Finnish Application No. 20175770 dated Dec. 21, 2017 (1 page).

* cited by examiner

LAYOUT GUIDANCE FOR LOCALIZATION

CROSS-REFERENCE TO RELATED APPLICATIONS

This Application claims priority to Finnish Application No. 20175770, filed Aug. 29, 2017 the entire disclosure of which is incorporated herein by reference.

BACKGROUND OF THE INVENTION

Field of the Invention

The present application generally relates to layout guidance. In particular, the present application relates to layout guidance for localization purposes.

Description of the Related Art

During e.g. the development of a software product, localization testing is usually conducted. When something in content (such as screen content) or layout is changed, localization testing is conducted for all the languages which the content will be translated to. This involves evaluating the space needed for translated texts in chosen languages since translating text from one language to another typically changes the length of the translated text from the length of the original source text. This in turn affects the required screen estate for a text paragraph for each language.

Typically, software development is done in multiple stages with the software logic and (graphical) user interface being developed first. Localization usually starts after the user interface is completed in order to avoid having to perform localization multiple times when the content changes. Furthermore, only after the texts have been translated to other languages it can be determined if the translated texts fit into the reserved area in the user interface.

Localization is usually performed by user interface designers or application developers who are rarely able to or required to understand the target language(s). The actual translations are usually provided by translators before the localization testing phase.

Known approaches to localization testing (before the translations are known) include various brute force based approaches. One example is replacing all texts with e.g. double length copies. Another example is allowing extra space for expansion based on the number of characters in a source language character string (e.g. a word, sentence, passage or a text string) such that the less there are characters the more space percentage-wise is reserved for expansion. For example, for up to ten characters in an English source character string, 200-300% space may be reserved for expansion when translating to other languages, whereas for over 70 characters in an English source character string, 130% space may be reserved for expansion when translating to other languages. Herein, a character string may refer to e.g. a text string, a passage or a paragraph, or the like, any of which may contain more than just text. For example, mathematical equations may be included in a passage or a paragraph.

However, brute force based approaches waste screen space which is particularly disadvantageous when the text or character string in the target language is intended to be viewed on a mobile device or any other device with a limited amount of display screen space. On the other hand, reserving too little space for the target language text or character string has its disadvantages too. For example, it may result in degraded readability due to having to use fonts that are too little. As a result of reserving too much or too little space, user interface related re-work and re-testing has to be performed, thus wasting time and effort.

Also, reserving too little space for the target language text or character string could result in some of the characters in the target language text or character string getting lost. Yet, in some fields it is particularly important that not even a single character goes missing from the target language text. Examples of this include texts in the medical field, such as texts related to clinical trials, informed consent applications, and the like. Accordingly, to avoid missing characters, one or more testing processes are typically conducted.

Furthermore, improved quality of pre-translation localization testing is particularly helpful in multi-phase software development where some functionalities are locked after the customer has approved screen contents (i.e. all the character strings to be translated and the layout). The locking of some of the functionalities occurs prior to the localizations, since the screen contents may be sent to a third-party review, such as an ethics committee review in clinical studies or medical studies. As even small changes would have to be re-approved, the cost of changes after that point would be significant. For these reasons, it is important to conduct pre-translation localization testing during development independently of localization and translations.

Furthermore, products, devices, display screen sizes and shapes, and application elements continue to change over time. For example, scrollable/foldable/combinable/flexible displays and the like may add special requirements for different display positions. E.g. a foldable 2-part display may contain two separate displays, such that when folded fully open, all space may be available; and when folded in a 45-degree position, some parts of the display may be invisible/unused. Also, horizontal/vertical display changes during use (such as auto-rotate) may result in there being twice or even more screens or display views to be sent for the third-party review per each application. Accordingly, user interface designers and application developers need to continuously adapt their localization testing procedures, in both pre- and post-translation phases.

Furthermore, the localization work might start only after an initial acceptance for software logic, layout and text has been obtained, and if issues arise in localizations for some of the target languages, changing the content of the user interface or parts of the user interface might not be possible any more.

SUMMARY OF THE INVENTION

An embodiment of an electronic device comprises a display, at least one processor, and at least one memory comprising computer program code corresponding to an application configured to provide layout guidance for localization. The at least one memory and the computer program code are configured to, with the at least one processor, cause the electronic device to at least:

receive information on a textual element in a source language, the textual element being within a graphical presentation having upper limits in at least a first dimension and a second dimension;

determine a space requirement in at least one of the first dimension and the second dimension for the textual element in a target language, based on the received information on the textual element in the source language and on statistical data related to the source language and the target language and their respective spatial requirements; and cause layout guidance to be displayed on the display for the textual element in the target language based on the determined space requirement.

In an embodiment, alternatively or in addition to the above described embodiments, the layout guidance comprises layout guidance or feedback to a user about whether a currently selected textual element size is sufficient in the target language.

In an embodiment, alternatively or in addition to the above described embodiments, the layout guidance further comprises layout guidance or feedback to the user about the probability of the currently selected textual element size being sufficient in the target language.

In an embodiment, alternatively or in addition to the above described embodiments, a graphical element within the graphical presentation is associated with the textual element, and wherein the layout guidance further comprises a proposal to the user about positioning of the textual element in the target language and the graphical element relative to each other.

In an embodiment, alternatively or in addition to the above described embodiments, the textual element comprises a character string, and the information on the textual element comprises the number of characters in the character string.

In an embodiment, alternatively or in addition to the above described embodiments, the information on the textual element further comprises the shape of the textual element.

In an embodiment, alternatively or in addition to the above described embodiments, the statistical data comprises information about the spatial requirements of the source language and the target language with respect to each other.

In an embodiment, alternatively or in addition to the above described embodiments, the statistical data is context based.

In an embodiment, alternatively or in addition to the above described embodiments, context comprises subject matter of the textual element.

In an embodiment, alternatively or in addition to the above described embodiments, the subject matter comprises medical text.

In an embodiment, alternatively or in addition to the above described embodiments, the statistical data comprises readability parameters including at least one of: font size, font type, font line weight, font color, background color, line spacing, screen contrast, screen resolution, or pixel density, to be used for the textual element in the target language.

In an embodiment, alternatively or in addition to the above described embodiments, the at least one memory and the computer program code are further configured to, with the at least one processor, cause the electronic device to update the statistical data.

An embodiment of a method of layout guidance for localization comprises:

receiving, by a processor, information on a textual element in a source language, the textual element being within a graphical presentation having upper limits in at least a first dimension and a second dimension;

determining, by the processor, a space requirement in at least one of the first dimension and the second dimension for the textual element in a target language, based on the received information on the textual element in the source language and on statistical data related to the source language and the target language and their respective spatial requirements; and causing, by the processor, layout guidance to be displayed on a display for the textual element in the target language based on the determined space requirement.

In an embodiment, alternatively or in addition to the above described embodiments, causing the layout guidance to be displayed comprises causing layout guidance or feedback to be displayed to a user about whether a currently selected textual element size is sufficient in the target language.

In an embodiment, alternatively or in addition to the above described embodiments, causing the layout guidance to be displayed comprises causing layout guidance or feedback to be displayed to the user about the probability of the currently selected textual element size being sufficient in the target language.

In an embodiment, alternatively or in addition to the above described embodiments, a graphical element within the graphical presentation is associated with the textual element, and wherein causing the layout guidance to be displayed comprises causing a proposal to be displayed to the user about positioning of the textual element in the target language and the graphical element relative to each other.

In an embodiment, alternatively or in addition to the above described embodiments, the textual element comprises a character string, and the information on the textual element comprises the number of characters in the character string.

In an embodiment, alternatively or in addition to the above described embodiments, the information on the textual element further comprises the shape of the textual element.

In an embodiment, alternatively or in addition to the above described embodiments, the statistical data comprises information about the spatial requirements of the source language and the target language with respect to each other.

In an embodiment, alternatively or in addition to the above described embodiments, the statistical data is context based.

In an embodiment, alternatively or in addition to the above described embodiments, context comprises subject matter of the textual element.

In an embodiment, alternatively or in addition to the above described embodiments, the subject matter comprises medical text.

In an embodiment, alternatively or in addition to the above described embodiments, the statistical data comprises readability parameters including at least one of: font size, font type, font line weight, font color, background color, line spacing, screen contrast, screen resolution, or pixel density, to be used for the textual element in the target language.

In an embodiment, alternatively or in addition to the above described embodiments, the method further comprises updating, by the processor, the statistical data.

An embodiment of a computer program product comprises at least one computer-readable storage medium, the computer-readable storage medium comprising a set of instructions, which, when executed by one or more processors, cause an electronic device to at least perform:

receiving information on a textual element in a source language, the textual element being within a graphical presentation having upper limits in at least a first dimension and a second dimension;

determining a space requirement in at least one of the first dimension and the second dimension for the textual element in a target language, based on the received information on the textual element in the source language and on statistical data related to the source language and the target language and their respective spatial requirements; and causing layout guidance to be displayed on a display for the textual element in the target language based on the determined space requirement.

At least some of the embodiments allow a smart approach to localization testing: space for expansion is taken only as much as needed plus optionally a small additional safety margin. Accordingly, space is saved in comparison to traditional brute force based approaches. Using an approach that takes into account to which target language the translation will be performed (and may also learn from field specific context, e.g. patient diaries in electronic clinical outcome assessments) saves space on the screen compared to an approach that estimates the space requirement based on a fixed multiplier that is intended to cover the space requirement for all the possible languages. Thus, less or no user interface related re-work and re-testing needs to be done, thereby saving time and effort and consequently saving costs.

At the same time, at least some of the embodiments allow maintaining readability and avoiding loss of any characters in the target language text.

Furthermore, at least some of the embodiments allow an optimal visual appearance since space for expansion is taken only as much as needed. Using too much or too little space for expansion (as is often the case with e.g. brute force based approaches) would result in an unappealing visual appearance, which is particularly undesirable in commercial products.

Furthermore, at least some of the embodiments require less experience and/or less knowledge about the target languages and target products from the user interface designers, application developers and testing personnel performing tasks relating to development and localization testing.

Furthermore, at least some of the embodiments allow increased productivity by providing the user interface designers and application developers with guidance and layout guidance or feedback that ensures they reserve a sufficient amount of space for the target language text or character string right away, rather than having to waste time and effort with trial and error. Testing whether the localizations fit the reserved area can be automatically done by the design tool of the invention during the development of the software or other product to be translated, thereby giving immediate layout guidance or feedback to the designer and resulting in higher quality pre-translation localization testing with minimal labor cost. Compared to performing the localization testing in the end only, this results in savings in labor cost for both designers and testers. Furthermore, the throughput times of projects are reduced and the resulting quality is improved which in turn results in improved customer satisfaction. Furthermore, user interface related re-work and re-testing decreases.

As the designers are getting layout guidance or feedback of when they have reserved enough space for the target languages, their knowledge and awareness of the issues is improved. This is an advantage since it may take time to, or it may not be possible to, implement this in all the products and processes that are often ad hoc in nature. The tools applying this approach may teach the designers about any issues and also teach them how much they should reserve space for different languages.

Furthermore, at least some of the embodiments allow eliminating or decreasing negative feedback from customers/end users due to localization that is performed faster yet resulting in optimal quality, due to e.g. achieved decreases in user interface related re-work and re-testing.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

Like reference numerals are used to designate like parts in the accompanying drawings.

DETAILED DESCRIPTION OF THE INVENTION

Reference will now be made in detail to embodiments of the present invention, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The embodiments provide a tool for evaluating the space needed for translated texts for chosen languages for conducting localization testing during the initial development of a software product or other product. The embodiments may utilize statistical data for creating an accurate representation of the space required for source and target languages in a database of known translation pairs of language A which is used for developing the product and target languages B, C, D, etc. to which that product is translated.

Translations T: X→Y are used to create a space requirement S: Y→S″. Space requirement has been defined for a given context which includes parameters such as font size, font type (e.g. italics, bolding, and the like), font line weight, font color, background color, line spacing, screen contrast, screen resolution, or pixel density, and domain specific design principles, etc. Domain specific design principles may include e.g. design principles specific to a mobile device display screen and/or design principles specific to a web site. These design principles may relate to e.g. layout design, such as horizontal/vertical layout design for mobile devices.

In the absence of translated text (Y), the tool may use parametrized estimation $T^*: X \rightarrow S''_{|Y}$ to provide layout guidance for the user to ensure sufficient space for the translated text.

One example of a layout guidance provided by the tool is an indicator showing whether the source text fits the reserved area in all target languages.

Furthermore, the space requirement S can be also transformed to S*, e.g. if the target language Y is a right-to-left (RTL) language. This becomes relevant for example, when the provided text area is non-symmetric.

T: X→Y;
S: Y→S'';
$T^*: X \rightarrow S''_{|Y}$; S='space requirement'
; n ∈ [1, 2,3] (=number of dimensions)
; |Y='for language Y'

It is to be understood that while the following embodiments utilize medical data and medical data related software displays as examples, the embodiments are not limited to these. Other examples may include e.g. labels (such as packaging labels), instruction manuals, web pages, any printed matter, any display screens, and the like, that are related to any subject matter.

Figure 1:
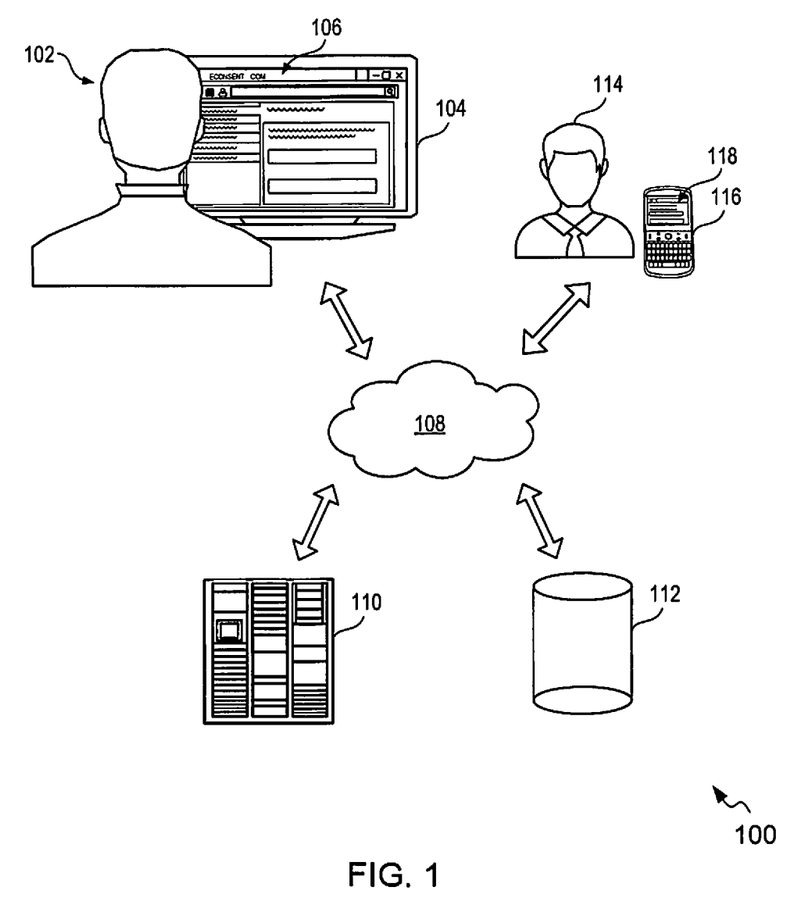
FIG. 1 illustrates an example system, where various embodiments of the present disclosure may be implemented.

FIG. 1 illustrates an example system 100, where various embodiments of the present disclosure may be implemented. An example representation of the system 100 is shown depicting a network 108 that connects entities such as a plurality of users (e.g., application designer 102 with device 104 and end-user 114 with device 116) and a server 110, as well as a database 112. The network 108 may be a centralized network or may comprise a plurality of sub-networks that may offer a direct communication between the entities or may offer indirect communication between the entities. Examples of the network 108 include wireless networks, wired networks, and combinations thereof. Some non-exhaustive examples of wireless networks may include wireless local area networks (WLANs), Bluetooth or Zigbee networks, cellular networks and the like. Some non-exhaustive examples of wired networks may include Local Area Networks (LANs), Ethernet, Fiber Optic networks and the like. An example of a combination of wired networks and wireless networks may include the Internet.

The end-user device 116 may be used to display the final end-user software product 118 (e.g. medical software product such as an electronic patient diary) translated to the target language. The device 104 may be used to run software product(s) 106 for designing and localizing the end-user software product 118. Accordingly, the embodiments described herein may be a part (e.g. a plugin) of the software product(s) 106 for designing and localizing the end-user software product 118.

Figure 2:
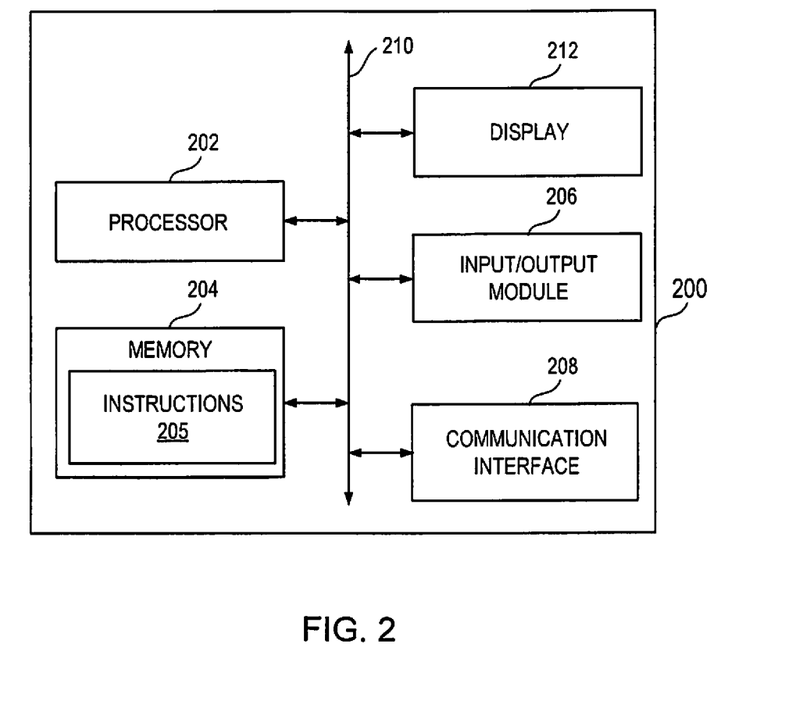
FIG. 2 is a block diagram of an electronic device configured to facilitate providing layout guidance for localization, in accordance with an example embodiment.
Figure 4:
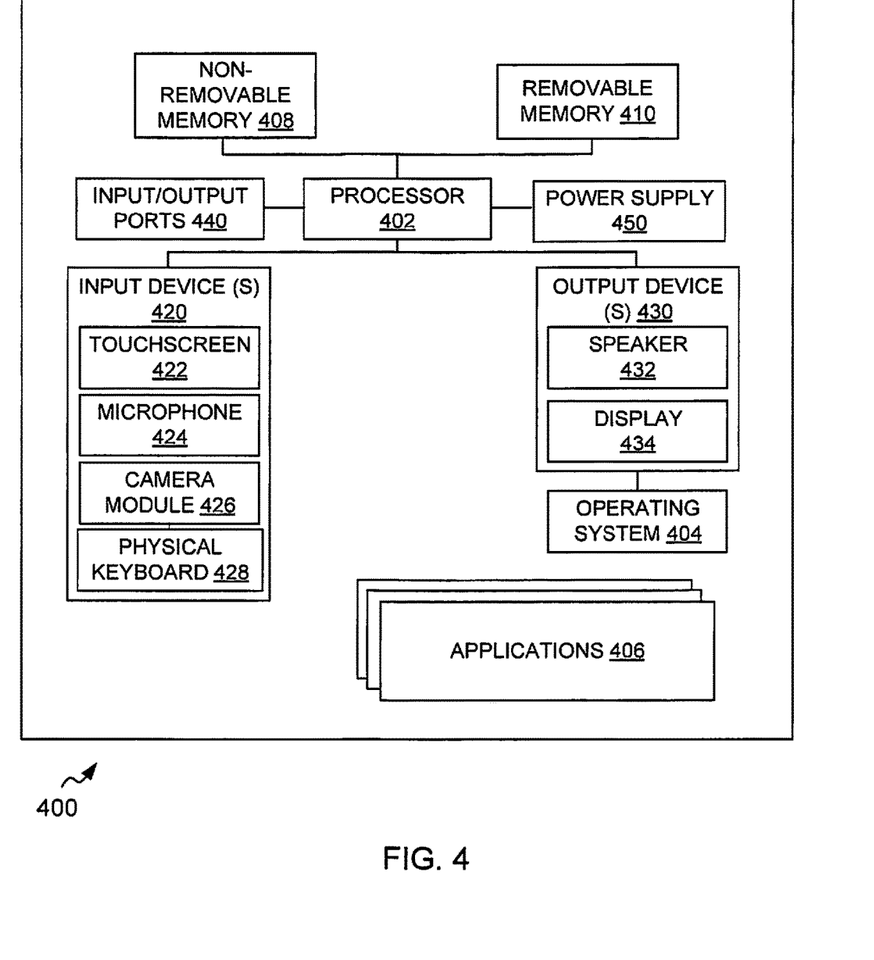
FIG. 4 illustrates an example of an electronic device capable of implementing example embodiments described herein.

The device 104 may include e.g. the electronic device 200 of FIG. 2 and/or the electronic device 400 of FIG. 4. Also, the device 116 may include e.g. the electronic device 200 of FIG. 2 and/or the electronic device 400 of FIG. 4. Devices 104 and 116 may include e.g. a desktop computer and a mobile phone, respectively, as shown in the system 100. Other examples of the device 104 include, but are not limited to, laptop computers, network server running a service, and/or a network terminal. Other examples of the device 116 include, but are not limited to, mobile devices and wearable devices, such as smartphones, tablets, smart watches, smart televisions, smart devices in homes, virtual reality devices, augmented reality devices, and/or Internet-of-Things (IoT) devices. In an embodiment, examples of the device 116 include, but are not limited to, devices having capability to participate in electronic clinical trials (such as electronic patient diaries) and/or electronic informed consent processes.

The device 104 may utilize the server 110 and/or the database 112. For example, the statistical data utilized in the various embodiments described herein may be stored in the database 112. Furthermore, at least some of the processes of the software product(s) 106 for designing and localizing the end-user software product 118 may be run on the server 110.

The electronic informed consent process is a part of overall clinical trial process. It is performed to fulfill regulatory requirement of obtaining informed consent. The informed consent process is a process by which a participant voluntarily confirms his or her willingness to participate in a clinical trial after having been informed of all aspects of the clinical trial that are relevant to the participant's decision to participate in the clinical trial.

An electronic patient diary is an electronic tool used e.g. in clinical trials. Typically, the electronic patient diary reminds a patient to fill in data (such as answers to validated questionnaires and symptoms occurrences, and/or other information about the patient's condition) at the right time and presents only the questions the patient should answer at that time. In addition, the electronic patient diary may time stamp the recorded data and maintain an audit trail of changes to the data in order to ensure the integrity and validity of the data.

FIG. 2 is a block diagram of an electronic device 200 that is configured to facilitate providing layout guidance for localization, in accordance with an example embodiment.

The electronic device 200 comprises a display 212, one or more processors 202, one or more memories 204 that comprise computer program code 205 corresponding to an application configured to provide layout guidance for localization. The electronic device 200 may also include an input/output module 206 and a communication interface 208.

Although the electronic device 200 is depicted to include only one processor 202, the electronic device 200 may include more processors. In an embodiment, the memory 204 is capable of storing instructions 205, where the instructions 205 include machine executable instructions associated with providing layout guidance for localization. Furthermore, the processor 202 is capable of executing the stored instructions 205. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

The input/output module (hereinafter referred to as 'I/O module') 206 is configured to facilitate provisioning of an output and/or receiving an input. The I/O module 206 is configured to be in communication with the processor 202 and the memory 204. Examples of the I/O module 206 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

In an embodiment, the I/O module 206 may be configured to provide a user interface (UI) configured to provide options or any other display to a user of the electronic device 200. In addition, the I/O module 206 may be integrated with mechanisms configured to receive inputs from the user of the electronic device 200.

The communication interface 208 may enable the electronic device 200 to communicate with other devices. In an embodiment, various components of the electronic device 200, such as the processor 202, the memory 204, the I/O module 206 and the communication interface 208 are configured to communicate with each other via or through a centralized circuit 210. The centralized circuit 210 may be various devices configured to, among other things, provide or enable communication between the components (202-208 and 212) of the electronic device 200. In certain embodiments, the centralized circuit 210 may be a central printed circuit board (PCB) such as a motherboard, a main board, a electronic device board, or a logic board. The centralized circuit 210 may also, or alternatively, include other printed circuit assemblies (PCAs) or communication channel media.

The electronic device 200 as illustrated and hereinafter described is merely illustrative of an electronic device that could benefit from embodiments of the invention and, therefore, should not be taken to limit the scope of the invention. It is noted that the electronic device 200 may include fewer or more components than those depicted in FIG. 2.

The one or more memories 204 and the computer program code 205 are configured to, with the one or more processors 202, cause the electronic device 200 to receive information on a textual element in a source language. The textual element is located within a graphical presentation that has at least a first upper limit in a first dimension and a second upper limit in a second dimension. For example, the first dimension may comprise a horizontal dimension and the second dimension may comprise a vertical dimension, or vice versa.

The graphical presentation may comprise e.g. a display screen of a software product, printed matter (such as a label, an instruction manual, a product description, or the like), or a web page. The graphical presentation may include one or more textual elements (such as text that includes at least one character) and one or more graphical elements (such as images and/or user interface elements including buttons, scrollbars and the like).

The textual element may comprise a character string, and the information on the textual element may comprise the number of characters in the character string. Alternatively or additionally, the information on the textual element may comprise the shape, size and/or dimensions of the textual element.

The one or more memories 204 and the computer program code 205 are further configured to, with the one or more processors 202, cause the electronic device 200 to determine a space requirement in at least one of the first dimension and the second dimension for the textual element in a target language, based on the received information on the textual element in the source language and on statistical data related to the source language and the target language and their respective spatial requirements. Optionally, a given safety margin may be included in the determined space requirement. The space requirement may comprise e.g. a minimum area requirement, an optimum area requirement, or a sufficient area requirement.

In an embodiment, the space requirement in the at least one of the first dimension and the second dimension for the textual element in the target language may include a space requirement in the at least one of the first dimension and the second dimension for the textual element in the target language to maintain readability.

The statistical data may be obtained e.g. from a database. The database may be external to the electronic device 200, such as the database 112 of FIG. 1. Alternatively, the database may be included in the electronic device 200. The statistical data may have been collected over time, e.g. based on previous localizations.

The statistical data may comprise information about the spatial requirements of the source language and the target language with respect to each other. Alternatively or additionally, the statistical data may be context based. Herein, the context comprises subject matter of the textual element. An example of the subject matter includes medical texts. In addition, the context may comprise e.g. the type of a graphical element (such as an image, a user interface element including a button, scrollbar, pop-up window, and the like).

Furthermore, the statistical data may comprise readability parameters including at least one of: font size, font type (e.g. italics, bolding, and the like), font line weight, font color, background color, line spacing, screen contrast, screen resolution, or pixel density, to be used for the textual element in the target language.

Furthermore, the statistical data may comprise font height, font width, and a location of the textual element within the graphical presentation. For example, when the graphical presentation is a display screen of a software product, the location may include e.g. a main menu and a navigation button. In an embodiment, the statistical data may comprise a location of the textual element with respect to one or more graphical elements.

The one or more memories 204 and the computer program code 205 are further configured to, with the one or more processors 202, cause the electronic device 200 to cause layout guidance to be displayed on the display 212 for the textual element in the target language based on the determined space requirement. The layout guidance may include e.g. one or more visual indicators. Optionally, the layout guidance may also include one or more aural indicators.

The one or more memories 204 and the computer program code 205 are further configured to, with the one or more processors 202, cause the electronic device 200 to update the statistical data. A more detailed example of the updating process is described below in connection with FIG. 3D.

The layout guidance may comprise layout guidance or feedback to a user about whether a currently selected textual element size is sufficient in the target language. Alternatively or additionally, the layout guidance may comprise layout guidance or feedback to the user about the probability of the currently selected textual element size being sufficient in the target language. Optionally, the layout guidance or feedback may be provided when the probability of the currently selected textual element size being sufficient in the target language exceeds or goes below a given threshold.

In an example, a graphical element within the graphical presentation may be associated with the textual element, and the layout guidance may comprise a proposal to the user about positioning of the textual element in the target language and the graphical element relative to each other. For example, the proposal may include a proposal about where in graphical presentation to place the graphical element in order to maximize or optimize space for the textual element.

Optionally, the layout guidance or feedback and/or the proposal may include one or more suggestions related to use of text wrap or hyphenation. Optionally, the layout guidance or feedback and/or the proposal may include one or more suggestions related to the shape of the textual element, based e.g. on previously used shapes for similar textual elements. Optionally, the layout guidance or feedback and/or the proposal may include one or more indications of how much space needs to be reserved for the textual element in the target language in order to maintain readability.

Figure 3A:
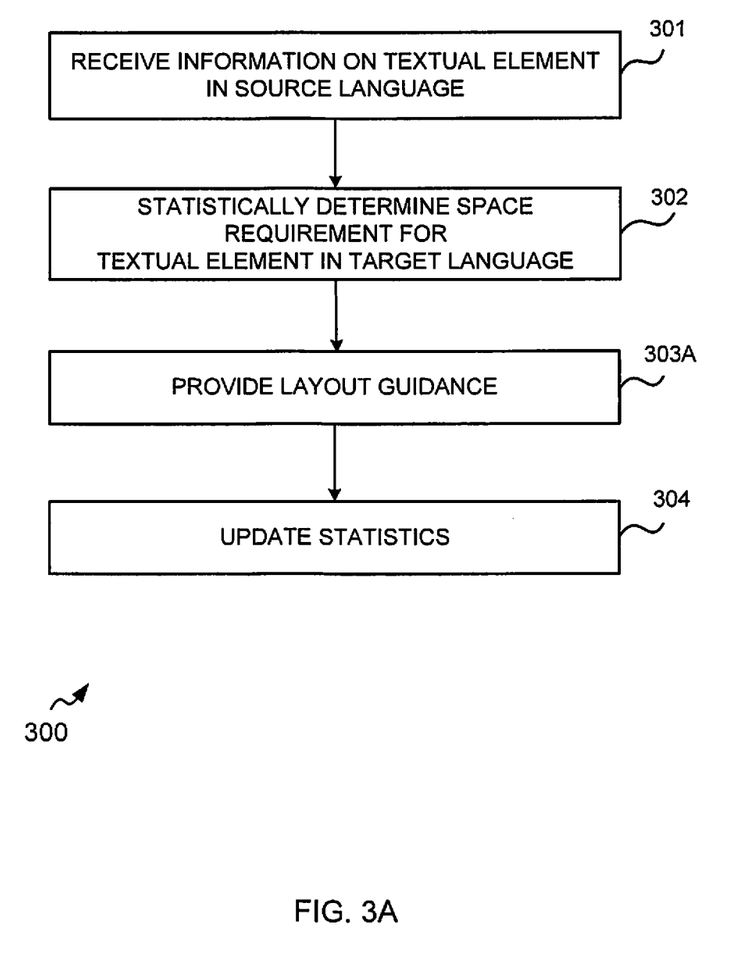
FIG. 3A illustrates an example flow diagram of a method of layout guidance for localization, in accordance with an example embodiment.

FIG. 3A illustrates an example flow diagram of a method 300 of layout guidance for localization, in accordance with an example embodiment. The example of FIG. 3A may be used e.g. by the electronic device 200 of FIG. 2 and/or the electronic device 400 of FIG. 4.

At operation 301, information on a textual element in a source language is received by a processor. The textual element is located within a graphical presentation that has at least a first upper limit in a first dimension and a second upper limit in a second dimension. The textual element may comprise a character string, and the information on the textual element may comprise the number of characters in the character string. Alternatively or additionally, the information on the textual element may comprise the shape, size and/or dimensions of the textual element.

At operation 302, the processor determines a space requirement in at least one of the first dimension and the second dimension for the textual element in a target language, based on the received information on the textual element in the source language and on statistical data related to the source language and the target language and their respective spatial requirements. The statistical data may comprise information about the spatial requirements of the source language and the target language with respect to each other. Alternatively or additionally, the statistical data may be context based. Herein, the context comprises subject matter of the textual element. An example of the subject matter includes medical texts. Also, the statistical data may comprise readability parameters including font size, font type, font line weight, font color, background color, line spacing, screen contrast, screen resolution, and/or pixel density, to be used for the textual element in the target language. Also, the space requirement to be determined in the at least one of the first dimension and the second dimension for the textual element in the target language may include a space requirement to maintain readability.

At operation 303A, the processor causes layout guidance to be displayed on a display for the textual element in the target language based on the determined space requirement.

At operation 304, the processor updates the statistical data. An example of operation 304 is described in more detail in FIG. 3D.

Figure 3B:
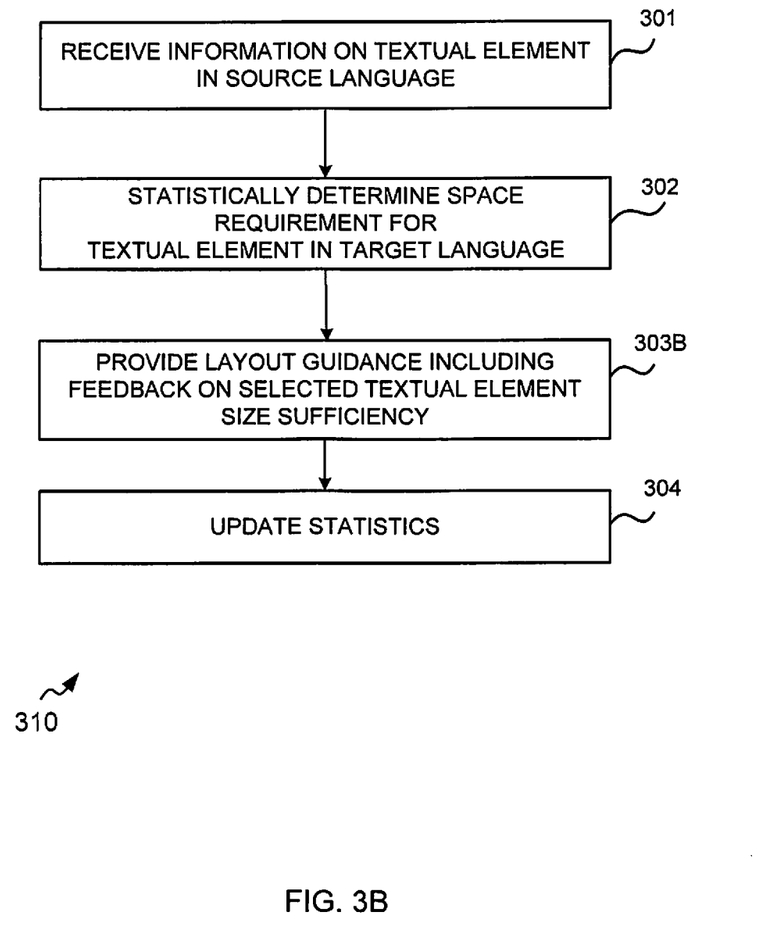
FIG. 3B illustrates another example flow diagram of a method of layout guidance for localization, in accordance with an example embodiment.

FIG. 3B illustrates another example flow diagram of a method of layout guidance for localization, in accordance with an example embodiment. The example of FIG. 3B may be used e.g. by the electronic device 200 of FIG. 2 and/or the electronic device 400 of FIG. 4.

In the example of FIG. 3B, operations 301, 302 and 304 are substantially similar to their counterparts in the example of FIG. 3A, so their descriptions are not repeated here in detail.

At operation 303B, the processor causes layout guidance or feedback to be displayed on a display to a user about whether a currently selected textual element size is sufficient in the target language, based on the determined space requirement (e.g. minimum or optimum space requirement). Optionally, the layout guidance or feedback to be displayed may include the probability of the currently selected textual element size being sufficient in the target language.

Figure 3C:
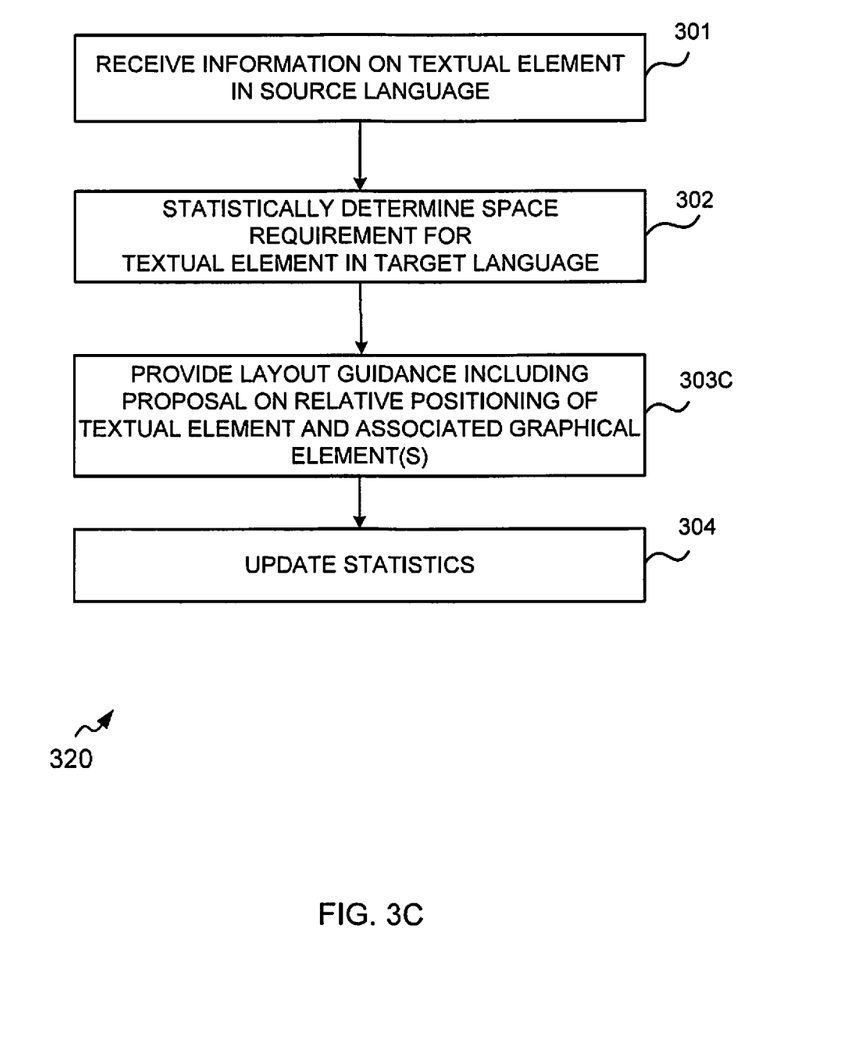
FIG. 3C illustrates yet another example flow diagram of a method of layout guidance for localization, in accordance with an example embodiment.

FIG. 3C illustrates yet another example flow diagram of a method of layout guidance for localization, in accordance with an example embodiment. The example of FIG. 3C may be used e.g. by the electronic device 200 of FIG. 2 and/or the electronic device 400 of FIG. 4.

In the example of FIG. 3C, operations 301, 302 and 304 are substantially similar to their counterparts in the example of FIG. 3A, so their descriptions are not repeated here in detail.

In the example of FIG. 3C, a graphical element within the graphical presentation is associated with the textual element. At operation 303C, the processor causes a proposal to be displayed on a display to the user about positioning of the textual element in the target language and the graphical element relative to each other, based on the determined space requirement (e.g. minimum or optimum space requirement).

Figure 3D:
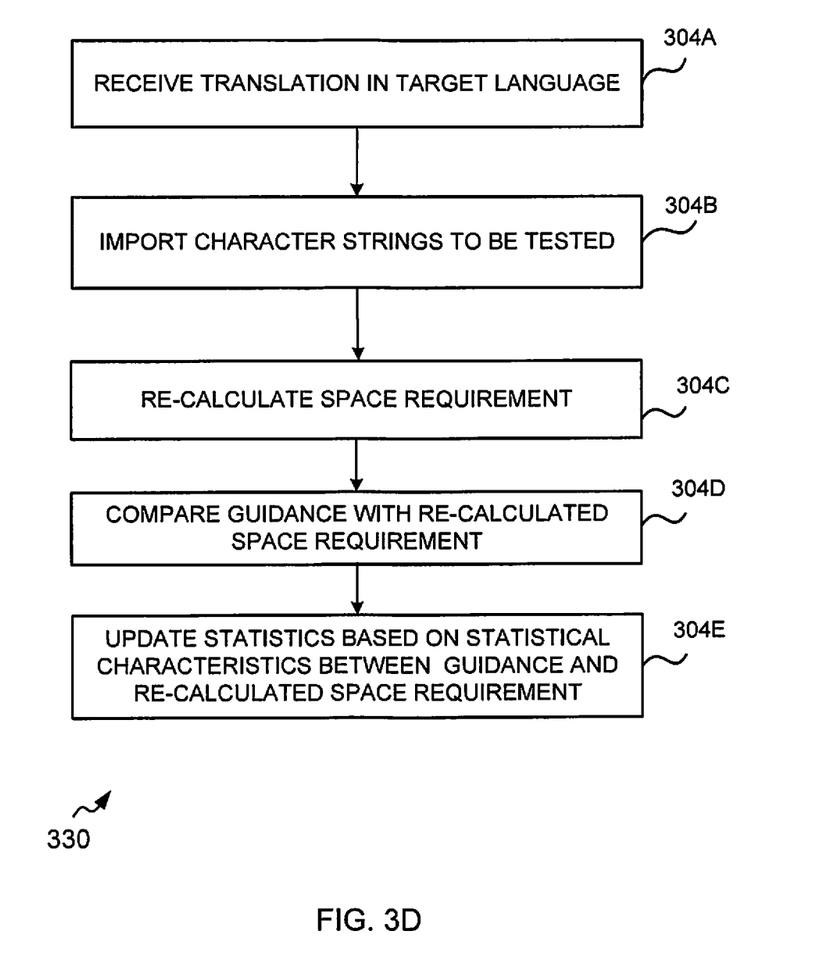
FIG. 3D illustrates an example flow diagram of operation 304 of FIGS. 3A, 3B and 3C, in accordance with an example embodiment.

FIG. 3D illustrates an example flow diagram of operation 304 of FIGS. 3A, 3B and 3C. The example of FIG. 3D may be used e.g. by the electronic device 200 of FIG. 2 and/or the electronic device 400 of FIG. 4.

At operation 304A, the processor receives a translation in a target language. At operation 304B, the processor imports character strings to be tested. At operation 304C, the processor re-calculates the space requirement. At operation 304D, the processor compares the layout guidance with the re-calculated space requirement. At operation 304E, the processor updates the statistics based on statistical characteristics between the layout guidance and the re-calculated space requirement. Operation 304E may utilize any suitable statistical model. At least in some embodiments, artificial intelligence and/or machine learning may be utilized in connection with at least one of the operations of FIG. 3D, e.g. in generating/providing the statistical model.

FIG. 4 further illustrates an example of an electronic device 400 capable of implementing example embodiments described herein. It should be understood that the electronic device 400 as illustrated and hereinafter described is merely illustrative of one type of electronic apparatus or device and should not be taken to limit the scope of the embodiments. As such, it should be appreciated that at least some of the components described below in connection with the electronic device 400 may be optional and thus in an example embodiment may include more, less or different components than those described in connection with the example embodiment of FIG. 4. As such, among other examples, the electronic device 400 could be any computer devices, such as any suitable servers, workstations, personal computers, laptop computers, and the like.

The illustrated electronic device 400 includes a controller or a processor 402 (i.e.—a signal processor, microprocessor, ASIC, or other control and processing logic circuitry) for performing such tasks as signal coding, data processing, input/output processing, power control, and/or other functions. An operating system 404 controls the allocation and usage of the components of the electronic device 400 and support for one or more application programs 406. The application programs 406 can include applications related to providing layout guidance for localization, or any other applications.

The illustrated electronic device 400 includes one or more memory components, for example, a non-removable memory 408 and/or removable memory 410. The non-removable memory 408 may include RAM, ROM, flash memory, a hard disk, or other well-known memory storage technologies. The removable memory 410 may include flash memory (such as one or more removable flash drives) or smart cards. The one or more memory components may be used for storing data and/or code for running the operating system 404 and the applications 406. Example of data may include text, images, sound files, image data, video data, or other data sets to be sent to and/or received from one or more network servers or other devices via one or more wired or wireless networks.

The electronic device 400 can support one or more input devices 420 and one or more output devices 430. Examples of the input devices 420 may include, but are not limited to, a touchscreen 422 (i.e., capable of capturing finger tap inputs, finger gesture inputs, multi-finger tap inputs, multi-finger gesture inputs, or keystroke inputs from a virtual keyboard or keypad), a microphone 424 (i.e., capable of capturing voice input), a camera module 426 (i.e., capable of capturing still picture images and/or video images) and a physical keyboard 428. Examples of the output devices 430 may include, but are not limited to a speaker 432 and a display 434. Other possible output devices (not shown) can include piezoelectric or other haptic output devices. Some devices can serve more than one input/output function. For example, the touchscreen 422 and the display 434 can be combined into a single input/output device.

The electronic device 400 can further include one or more input/output ports 440, and a power supply 450. The illustrated components are not required or all-inclusive, as any of the components shown can be deleted and other components can be added.

The exemplary embodiments can include, for example, any suitable servers, workstations, personal computers, laptop computers, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more satellite communications networks, wireless communications networks, cellular communications networks, 3G communications networks, 4G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like.

Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Passenger Request Broker Architecture (CORBA) passengers, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, and the like. Non-volatile media can include, for example, optical or magnetic disks, magneto-optical disks, and the like. Volatile media can include dynamic memories, and the like. Common forms of computer-readable media can include, for example, a floppy disk, a flexible disk, hard disk, or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. An electronic device, comprising:
   a display;
   at least one processor; and
   at least one memory comprising computer program code corresponding to an application configured to provide layout guidance for localization, the at least one memory and the computer program code configured to, with the at least one processor, cause the electronic device to at least:
   receive information on a textual element in a source language, the textual element being within a graphical presentation having upper limits in at least a first dimension and a second dimension;
   determine a space requirement in at least one of the first dimension and the second dimension for the textual element in a target language, based on the received information on the textual element in the source language and on updatable statistical data related to the source language and the target language and their respective spatial requirements, wherein the source and target languages are different languages; and
   cause layout guidance to be displayed on the display for the textual element in the target language based on the determined space requirement, wherein the layout guidance includes a proposal to modify a parameter of the textual element in the target language in order to avoid loss of any characters in the target language within the determined space requirement; and
   update the updatable statistical data based on statistical characteristics between the layout guidance and a re-calculated space requirement.

2. The electronic device according to claim 1, wherein the layout guidance comprises layout guidance or feedback to a user about whether a currently selected textual element size is sufficient in the target language.

3. The electronic device according to claim 1, wherein the layout guidance comprises layout guidance or feedback to the user about the probability of the currently selected textual element size being sufficient in the target language.

4. The electronic device according to claim 1, wherein a graphical element within the graphical presentation is associated with the textual element, and wherein the layout guidance comprises a proposal to the user about positioning of the textual element in the target language and the graphical element relative to each other.

5. The electronic device according to claim 1, wherein the textual element comprises a character string, and the information on the textual element comprises the number of characters in the character string.

6. The electronic device according to claim 5, wherein the information on the textual element further comprises the shape of the textual element.

7. The electronic device according to claim 1, wherein the updatable statistical data comprises information about the spatial requirements of the source language and the target language with respect to each other.

8. The electronic device according to claim 1, wherein the updatable statistical data is context based.

9. The electronic device according to claim 8, wherein the context comprises subject matter of the textual element.

10. The electronic device according to claim 9, wherein the subject matter comprises medical text.

11. The electronic device according to claim 1, wherein the updatable statistical data comprises readability parameters including at least one of: font size, font type, font line weight, font color, background color, line spacing, screen contrast, screen resolution, or pixel density, to be used for the textual element in the target language.

12. A method of layout guidance for localization, comprising:
   receiving, by a processor, information on a textual element in a source language, the textual element being within a graphical presentation having upper limits in at least a first dimension and a second dimension;
   determining, by the processor, a space requirement in at least one of the first dimension and the second dimension for the textual element in a target language, based on the received information on the textual element in the source language and on updatable statistical data related to the source language and the target language and their respective spatial requirements, wherein the source and target languages are different languages; and
   causing, by the processor, layout guidance to be displayed on a display for the textual element in the target language based on the determined space requirement, wherein the layout guidance includes a proposal to modify a parameter of the textual element in the target language in order to avoid loss of any characters in the target language within the determined space requirement; and
   updating, by the processor, the updatable statistical data based on statistical characteristics between the layout guidance and a re-calculated space requirement.

13. The method according to claim 12, wherein causing the layout guidance to be displayed comprises causing layout guidance or feedback to be displayed to a user about whether a currently selected textual element size is sufficient in the target language.

14. The method according to claim 12, wherein causing the layout guidance to be displayed comprises causing layout guidance or feedback to be displayed to the user about the probability of the currently selected textual element size being sufficient in the target language.

15. The method according to claim 12, wherein a graphical element within the graphical presentation is associated with the textual element, and wherein causing the layout guidance to be displayed comprises causing a proposal to be displayed to the user about positioning of the textual element in the target language and the graphical element relative to each other.

16. The method according to claim 12, wherein the textual element comprises a character string, and the information on the textual element comprises the number of characters in the character string.

17. The method according to claim 16, wherein the information on the textual element further comprises the shape of the textual element.

18. The method according to claim 12, wherein the updatable statistical data comprises information about the spatial requirements of the source language and the target language with respect to each other.

19. The method according to claim 12, wherein the updatable statistical data is context based.

20. The method according to claim 19, wherein the context comprises subject matter of the textual element.

21. The method according to claim 20, wherein the subject matter comprises medical text.

22. The method according to claim 12, wherein the updatable statistical data comprises readability parameters including at least one of: font size, font type, font line weight, font color, background color, line spacing, screen contrast, screen resolution, or pixel density, to be used for the textual element in the target language.

23. A computer program product comprising at least one computer-readable storage medium, the computer-readable storage medium comprising a set of instructions, which, when executed by one or more processors, cause an electronic device to at least perform:
- receiving information on a textual element in a source language, the textual element being within a graphical presentation having upper limits in at least a first dimension and a second dimension;
- determining a space requirement in at least one of the first dimension and the second dimension for the textual element in a target language, based on the received information on the textual element in the source language and on updatable statistical data related to the source language and the target language and their respective spatial requirements, wherein the source and target languages are different languages; and
- causing layout guidance to be displayed on a display for the textual element in the target language based on the determined space requirement, wherein the layout guidance includes a proposal to modify a parameter of the textual element in the target language in order to avoid loss of any characters in the target language within the determined space requirement; and
- updating the updatable statistical data based on statistical characteristics between the layout guidance and a re-calculated space requirement.

* * * * *